(12) United States Patent
Foss et al.

(10) Patent No.: US 8,280,785 B1
(45) Date of Patent: Oct. 2, 2012

(54) FINANCIAL ACCOUNT MANAGER

(75) Inventors: Lucinda Kathryn Foss, San Francisco, CA (US); Charles Shieh, Cupertino, CA (US); June H. Fujimoto, Burbank, CA (US)

(73) Assignee: Intuit Inc., Mountain View, CA (US)

( * ) Notice: Subject to any disclaimer, the term of this patent is extended or adjusted under 35 U.S.C. 154(b) by 475 days.

(21) Appl. No.: 12/246,401

(22) Filed: Oct. 6, 2008

(51) Int. Cl.
*G07B 17/00* (2006.01)
*G07F 19/00* (2006.01)
*G06Q 40/00* (2012.01)

(52) U.S. Cl. .............................. 705/30; 705/35; 705/42

(58) Field of Classification Search .............. 705/22–35
See application file for complete search history.

(56) References Cited

U.S. PATENT DOCUMENTS

| | | | |
|---|---|---|---|
| 6,741,724 B1 * | 5/2004 | Bruce et al. | 382/101 |
| 7,870,078 B2 * | 1/2011 | Clark et al. | 705/318 |
| 2002/0120846 A1 * | 8/2002 | Stewart et al. | 713/168 |
| 2005/0211765 A1 * | 9/2005 | Brown et al. | 235/379 |
| 2006/0106703 A1 * | 5/2006 | Del Rey et al. | 705/35 |
| 2008/0319889 A1 * | 12/2008 | Hammad | 705/35 |

* cited by examiner

*Primary Examiner* — Ig T An
(74) *Attorney, Agent, or Firm* — Osha Liang LLP (57) ABSTRACT

A method for managing financial accounts, comprising obtaining a data item, a first account, and a second account, generating a plurality of change requests comprising the data item, sending the one of the plurality of change requests to a first financial institution managing the first account, wherein the data item is used by the first financial institution to update the first financial account, sending one of the plurality of change requests to a second financial institution managing the second account, wherein the data item is used by the second financial institution to update the second financial account, receiving a plurality of notifications associated with a status of the first account and a status of the second account, and reporting the plurality of notifications.

20 Claims, 9 Drawing Sheets

FIG. 1

| Options | | Accounts | Detail |
|---|---|---|---|
| Lost Card | Change Address | Checking | ... |
| Lost Card | Change Address | Savings | ... |
| Lost Card | Change Address | Cash | ... |
| Lost Card | Change Address | Market | ... |
| Lost Card | Change Address | Loans | ... |
| Lost Card | Change Address | Assets | ... |
| Lost Card | Change Address | Insurance | ... |

200 Graphical Interface

FIG. 2

| Financial Institution | Account Type | Account Access | Access Details |
|---|---|---|---|
| Bank A | Checking | server to server | ... |
| Bank A | Savings | script | ... |
| Bank B | Checking | script | ... |
| Investment Firm C | Market | server to server | ... |
| Credit Union D | Residential Loan | server to server | ... |
| Bank E | Checking | script | ... |
| Insurance Firm F | Insurance | script | ... |

Account Access Data Table 300

FINANCIAL ACCOUNT MANAGER

BACKGROUND

In general, personal finance is related to the application of financial principles to monetary decisions of an individual or family unit. Personal finance typically takes into account financial risks and future events in determining how the individual or family unit obtains, budgets, saves, and spends financial resources. Components of personal finance may include the monitoring and management of various items, such as bank accounts, investment accounts, retirement accounts, credit card accounts, consumer loan accounts, social security benefits, insurance policies, income tax, etc.

During the daily lives of an individual or family unit, one or more events occur that affect the status of one or more accounts. For example, an individual may move, lose a credit card, change names, or otherwise be affected by an event. Such events trigger the need to update entities (e.g., financial institutions, governmental entities, etc.) regarding the status of one or more accounts. To successfully contact the entities, information must be maintained and recalled regarding the account information and the contact information for each of the accounts associated with the individual or family unit.

SUMMARY

In general, in one aspect, the invention relates to a method for managing financial accounts, comprising: obtaining a data item, a first account, and a second account; generating a plurality of change requests comprising the data item; sending the one of the plurality of change requests to a first financial institution managing the first account, wherein the data item is used by the first financial institution to update the first financial account; sending one of the plurality of change requests to a second financial institution managing the second account, wherein the data item is used by the second financial institution to update the second financial account; receiving a plurality of notifications associated with a status of the first account and a status of the second account; and reporting the plurality of notifications.

In general, in one aspect, the invention relates to a method for managing financial accounts, comprising: updating a first account at a first financial institution using a data item; receiving a request to update a second account at a second financial institution and a third account at a third financial institution using the data item after updating the first account; granting the request to update the second account, wherein a change request comprising the data element is generated in response to granting the request and sent to the second financial institution for updating the second account; and receiving a report indicating a status of the second account after updating the second account.

In general, in one aspect, the invention relates to a system for managing financial accounts, comprising: a processor; a memory operatively connected to the processor; and a financial account manager resident in the memory and configured to: obtain a data item, a first account, and a second account; generate a plurality of change requests comprising the data item; send the one of the plurality of change requests to a first financial institution managing the first account, wherein the data item is used by the first financial institution to update the first financial account; send one of the plurality of change requests to a second financial institution managing the second account, wherein the data item is used by the second financial institution to update the second financial account; receive a plurality of notifications associated with a status of the first account and a status of the second account; and report the plurality of notifications.

In general, in one aspect, the invention relates to a computer readable medium storing instructions to manage financial accounts, the instructions comprising functionality to: obtain a data item, a first account, and a second account; generate a plurality of change requests comprising the data item; send the one of the plurality of change requests to a first financial institution managing the first account, wherein the data item is used by the first financial institution to update the first financial account; send one of the plurality of change requests to a second financial institution managing the second account, wherein the data item is used by the second financial institution to update the second financial account; receive a plurality of notifications associated with a status of the first account and a status of the second account; and report the plurality of notifications.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing financial accounts. In general, embodiments of the invention provide a system and method for updating multiple financial accounts with an address change. In general, embodiments of the invention provide a system and method for alerting multiple financial accounts when cards of those accounts have been lost or stolen.

Figure 1:
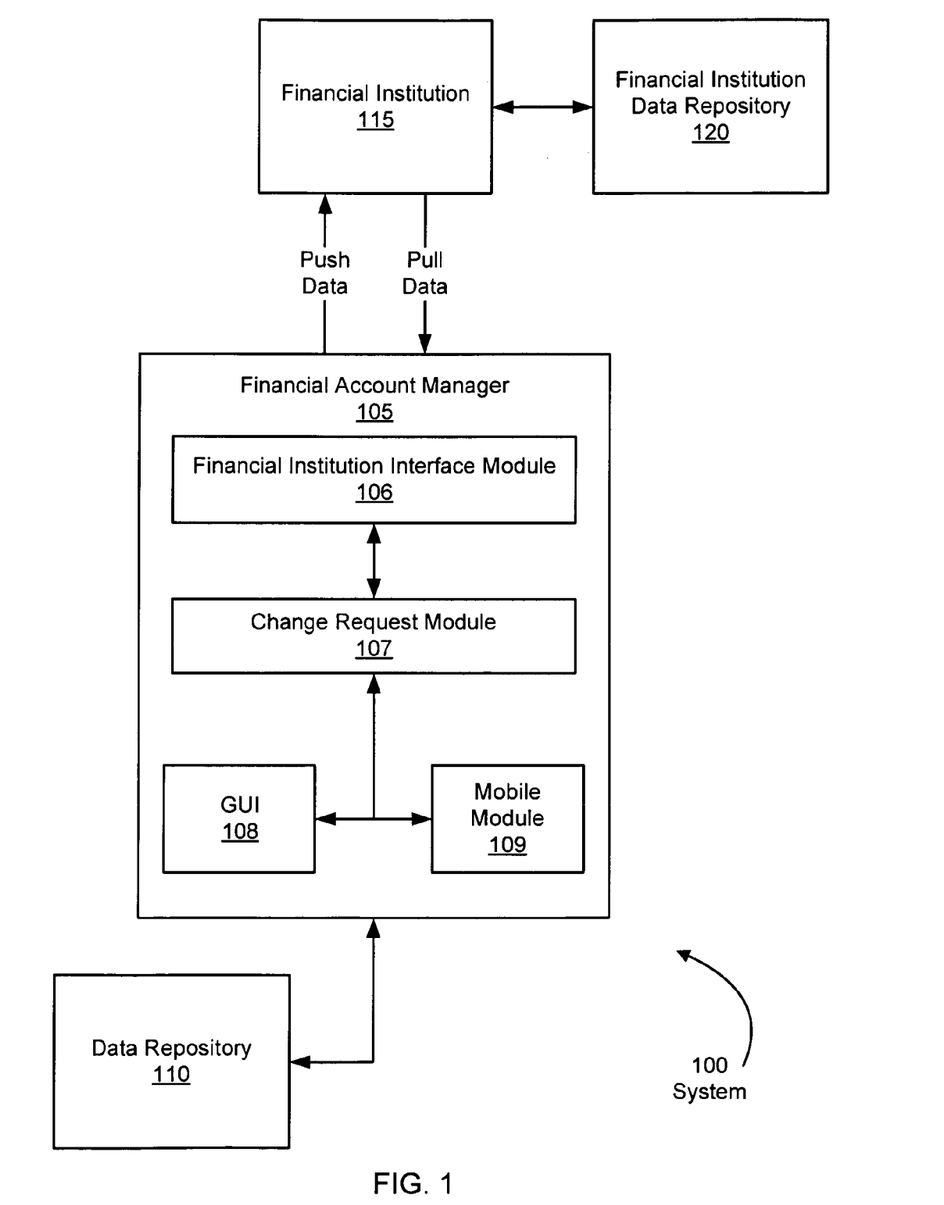
FIG. 1 shows a system in accordance with one or more embodiments of the invention.

FIG. 1 shows a system (100) in accordance with one or more embodiments of the invention. As shown in FIG. 1, the system (100) has multiple components including a financial account manager (105), a data repository (110), a financial institution (115), and a financial institution data repository (120). These components are described below and may be located on the same device (e.g. a server, mainframe, desktop personal computer (PC), laptop, personal digital assistant (PDA), telephone, mobile phone, kiosk, cable box, and any other device) or may be located on separate devices connected by a network (e.g. the Internet), with wired and/or wireless segments. Those skilled in the art will appreciate that there may be more than one financial account manager running on a device, interfacing with more than one financial institution, data repository, and financial institution data repository.

In one or more embodiments of the invention, a financial account manager (105) allows management of financial accounts, and has multiple components, including a financial institution interface module (106), a change request module (107), a graphical user interface (GUI) (i.e. GUI (108)), and a mobile module (109). The financial institution interface module (106) acts as a link between the financial institution (115) and the financial account manager (105). The financial institution interface module (106) pulls data from the financial institution (115) associated with accounts at that financial institution (115), and pushes data regarding updates to accounts associated with the financial institution (115). Pushed data could be, for example, associated with a change of address of an individual that has an account with the financial institution (115), or a lost or stolen credit card of an individual that has an account with the financial institution (115). The change request module (107) processes account information that is to be pushed to the financial institution (115). It, in conjunction with the data repository (110), manages the financial account data.

In one or more embodiments of the invention, a financial account manager (105) includes a GUI (108). The GUI (108) allows for user interaction with the system (100), and enables a user (e.g. an owner of a financial account, joint owner of a financial account, custodian of a financial account, and the like) to input updated data for the change request module (107) to process.

Figure 2:
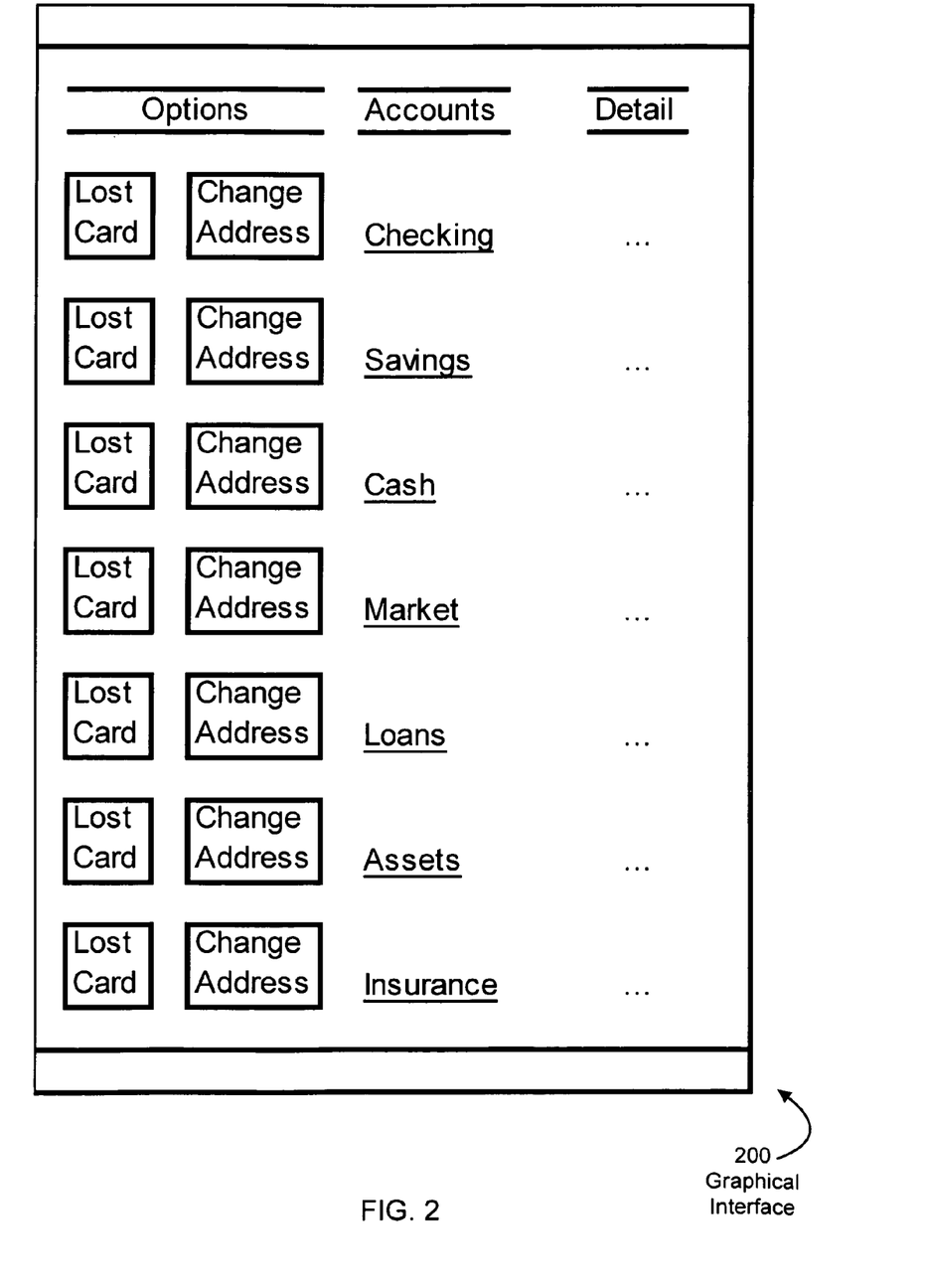
FIG. 2 shows a graphical interface in accordance with one or more embodiments of the invention.

FIG. 2 demonstrates an exemplary graphical interface (200). The graphical interface (200) may have various components, including "accounts", which lists the accounts held by a user (e.g. checking, savings, cash, market, loans, assets, and insurance), "details" associated with those accounts (e.g. account numbers, balances, and the like), and "options" such as "lost card", which allows a user to indicate that one or more cards associated with one or more financial accounts has been lost, and "change address", which allows a user to specify a change of address associated with one or more accounts. Those skilled in the art will appreciate that these components are exemplary, and are not exhaustive of the possible elements a graphical interface may have.

Continuing with FIG. 1, a financial account manager (105) includes a mobile module (109) in accordance with one or more embodiments of the invention. The mobile module (109) allows a user of the system (100) to make requests (e.g. a change of address request, or a lost card request) from a mobile device (e.g. mobile phone, smart phone, PDA, and the like). The mobile module (109) obtains a request from a user through a mobile device, and transmits this data to the change request module (107), where it is processed. A user may input a request through a mobile device in various ways (e.g. a text message, voice commands through a phone call, data transmission over the Internet through a mobile version of the aforementioned GUI (108), and the like). The mobile module (109) is a mechanism by which a user may rapidly alert financial institutions of a lost or stolen wallet.

In one or more embodiments of the invention, if a user loses his wallet, or has his wallet stolen, the moment he realizes that his wallet is missing, he can notify the financial account manager (105) of the situation. He may send a text message to a number associated with the financial account manager (105) that specifies, for instance, "missing wallet". This text will be processed by the mobile module (109), which may proceed to send a response text back to the user asking for authentication (e.g. a unique identifier such as a social security number, username, password, or personal identification number), and after authentication the mobile module (109) may send the user a text requesting further details regarding the missing wallet (e.g. a permission to inform a set of financial institutions, specified by a list of financial accounts associated with the user, of potential missing cards).

The mobile module (109) communicates with the change request module (107) during this process, and once the user has completed the request process, the change request module (107) will send the request data to various financial institutions (e.g. financial institution (115)) through the financial institution interface module (106). The financial institutions may then cancel the cards they were informed of or place them on hold until further inquiry. Subsequently, the user may receive a text message alerting him to the status of the requests made of the financial institutions (e.g. cancellation of card A "succeeded", cancellation of card B "failed", cancellation of card C "indeterminate", and the like). Those skilled in the art will appreciate that this mechanism is a manner by which a user may quickly alert his financial institutions of a lost or stolen wallet, and retain peace of mind, knowing that he is taking an action that will protect his financial security. For example, the mobile module (109) mechanism may protect a user's credit cards from being used by a thief to make fraudulent charges.

Figure 3A:
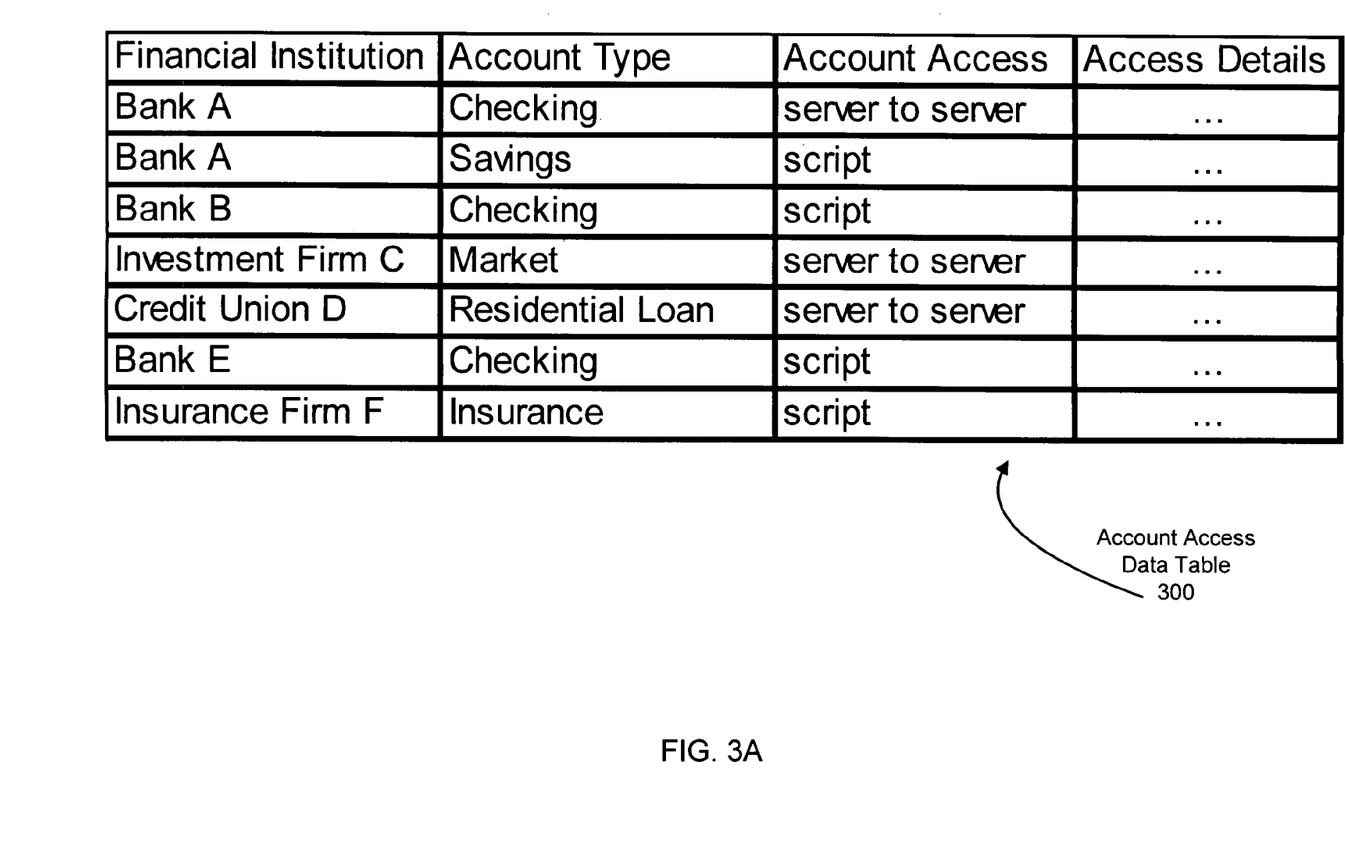
FIGS. 3A and 3B show a system component in accordance with one or more embodiments of the invention.

In one or more embodiments of the invention, the data repository (110) shown in FIG. 1 stores account access data. FIG. 3A demonstrates an exemplary account access data table (300). Those skilled in the art, having the benefit of this detailed description, will appreciate that the table shown in FIG. 3A may differ among embodiments of the invention, and that one or more of the table data may be optional.

The table of FIG. 3A holds data associated with the account access of financial institutions, and contains entries including "financial institution", "account type", "account access", and "access details". The "financial institution" entry contains the names of financial institutions (e.g. bank A, investment firm C, credit union D, and the like), the "account type" entry contains the types of accounts that those financial institutions offer (e.g. checking, savings, market, residential loan, insurance, and the like), the "account access" entry contains information about the method by which associated accounts may be accessed (e.g. server to server, script, application programming interface (API), and the like), and the "access details" entry specifies details associated with the account access (e.g. connection ports, authentication strings, usernames, passwords, URLs, and the like).

Continuing with FIG. 1, financial institutions may offer various methods by which the financial account manager (105) may access their information technology (IT) systems and securely push request data (relationships are required between the financial account manager (105) and financial institutions for this access to exist). A direct server to server connection may be available at some financial institutions, and not available at others, in which case the financial account manager (105) is required to use other methods to transmit request data. Another method that may be used by the financial account manager (105) to push request data to a financial institution (115) is a web page script. A web page script is a program that may fill out a web page form on the web site of a financial institution (115), and execute a "submit" of that form, effectively pushing data to the financial institution (115) through their web page. For example, some financial institutions have a change address form on their web sites, and the aforementioned script is a mechanism by which the financial account manager (105) may push a change address request to a financial institution (115) without having a direct server to server connection in place. The script would simply use the request data of a user, and transfer this data to the corresponding fields (e.g. original address, new address, authentication information, and the like) of the financial institution's change address web page, to be submitted. Those skilled in the art will appreciate that there may be other mechanisms not described by which the financial account manager (105) may push request data to a financial institution (115).

Figure 3B:
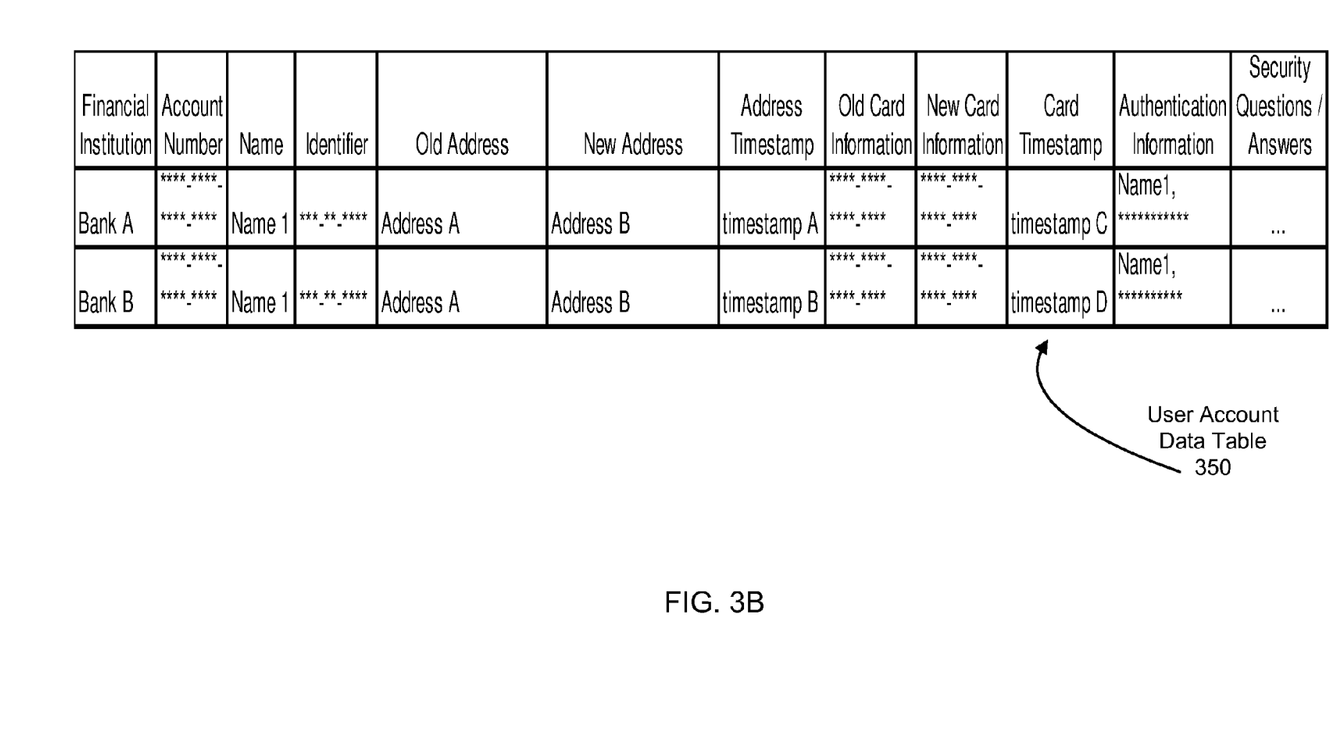

Referring to FIG. 1, a data repository (110) stores user account data in accordance with one or more embodiments of the invention. FIG. 3B demonstrates an exemplary user account data table (350). Those skilled in the art, having the benefit of this detailed description, will appreciate that the table shown in FIG. 3B may differ among embodiments of the invention, and that one or more of the table data may be optional.

The table of FIG. 3B hold data associated with users' financial accounts associated with the user(s), and contains entries including "financial institution", "account number", "name", "identifier", "old address", "new address", "address timestamp", "old card information", "new card information", "card timestamp", "authentication information", and "security questions & answers". The "financial institution" entry contains names of financial institutions tied to financial accounts (e.g. bank A, bank B, and the like) held by users, the "account number" entry contains account numbers associated with accounts held by users, the "name" entry contains the names of users that hold associated financial accounts, the "identifier" entry contains unique identifiers of holders of financial accounts (e.g. social security number), the "old address" entry contains prior address information of users tied to specific financial accounts, the "new address" entry contains updated address information of users tied to specific financial accounts (i.e. in the case of an address change request), the "address timestamp" entry contains a timestamp of when the new address information was updated (e.g. UTC 2008-06-25T15:21 Z), the "old card information" entry contains prior card information tied to specific accounts (e.g. a credit card number, debit card number, and the like), the "new card information" entry contains new card information tied to specific accounts (i.e. in the case of a missing wallet where a card is cancelled and reinstated with a new number by a financial institution), the "card timestamp" entry contains a timestamp of when the new card information was updated (e.g. UTC 2008-06-25T15:21 Z), the "authentication information" entry contains authentication information of a user associated with a specific account (e.g. username, password, and the like), and the "security questions & answers" entry contains security questions associated with specific financial accounts, and their corresponding answers (e.g. "in what city where you born", "Los Angeles"). Those skilled in the art will appreciate that there may be numerous other data schemes associated with the table of FIG. 3B.

Continuing with FIG. 1, a financial institution (115) (e.g. a bank, investment firm, credit union, insurance company, brokerage house, immigration authority, and the like) holds financial accounts associated with individuals, and pushes and pulls financial data to and from the financial account manager (105) in accordance with one or more embodiments of the invention. The financial institution (115) may receive updates from the financial account manager (105) regarding a user's financial account data (e.g. a changed address, a missing wallet, etc.), and may update the internal systems and the financial institution data repository (120) with said updates. Those skilled in the art will appreciate that these updates offer a significant benefit to the financial institution (115), because the financial institution (115) may now access financial data that is more current (e.g. new address information) than the corresponding data (e.g. old address information) held in the financial institution data repository (120). In one or more embodiments of the invention, the aforementioned timestamps held in the data repository (110) enable financial institutions to keep track of how current financial data may be. Benefits may be afforded to users of the system (100), including the convenience of updating a set of financial accounts from a single point of execution (i.e. the financial account manager (105)), as well as increased security when cards are lost or stolen.

Continuing with FIG. 1, a financial institution data repository (120) stores financial data associated with financial accounts in accordance with one or more embodiments of the invention. In one or more embodiments of the invention, the financial institution (115) maintains control over the financial institution data repository (120), and inserts new data upon accepting request data from the financial account manager (105). For example, when a financial institution (115) receives a change address request associated with an updated address of a user, and after sufficient authentication from the financial account manager (105), the table entries associated with the current address of the user are updated in the financial institution data repository (120). Further, the data in these table entries are replaced with the updated address information. Those skilled in the art will appreciate that various mechanisms may be used to accomplish this functionality.

In one or more embodiments of the invention, a user initially sets up his account in the financial account manager (105) before the user is capable of using the account. In one or more embodiments of the invention, the financial account manager (105) obtains identification information (e.g. name, address, social security number, driver's license, and the like), login information (e.g. username, password, security question answers, and the like), and account information (e.g. financial institution, type of account, account number, username, password, and the like). In one or more embodiments of the invention, the financial account manager (105) obtains as much account information for as many accounts as the user provides, and then ends the set up process. Those skilled in the art will appreciate that this process may be performed in various other ways and in numerous orders.

Figure 4A:
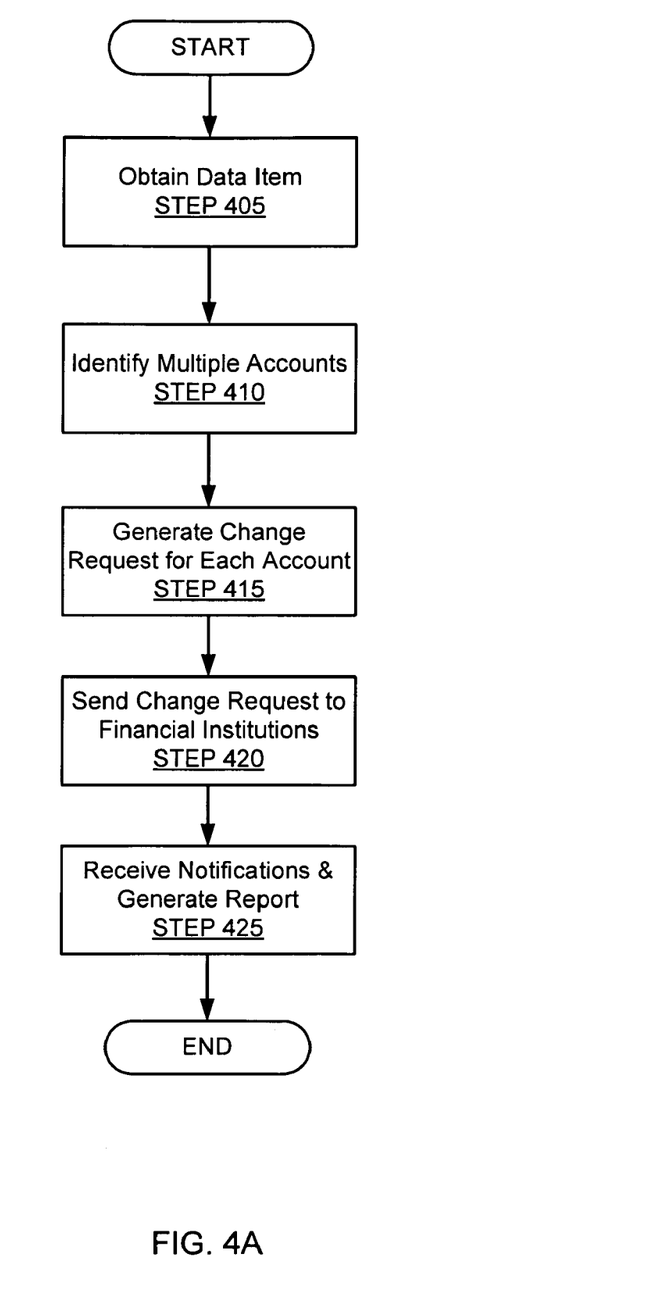
FIGS. 4A and 4B show flowcharts in accordance with one or more embodiments of the invention.

FIG. 4A shows a flowchart in accordance with one or more embodiments of the invention. The process shown in FIG. 4A may be used, for example, to manage financial accounts. Those skilled in the art, having the benefit of this detailed description, will appreciate that the sequence of steps shown in FIG. 4A may differ among embodiments of the invention, and that one or more of the steps may be optional.

In STEP 405, a data item associated with a change request (e.g. new address, or a missing wallet) is obtained. This data item may be obtained from a user through a computer, mobile device, financial software, or other mechanism.

In STEP 410, multiple accounts associated with the user are identified, for example, by using a unique identifier (e.g. social security number) provided by the user to access said accounts. In the case of an address change, a set of financial accounts associated with the user is identified along with a specified old address in accordance with one or more embodiments of the invention. In other words, a user may have a set of accounts associated with an address A, and a set of accounts associated with an address B. If the user is changing address A to address C, but not changing address B, then a set of accounts associated with the user and address A, but not those accounts associated with the user and address B, are identified. Once the accounts are identified, permission of the user is requested to generate change requests for a subset of the accounts, as selected by the user.

In STEP 415, a change request is generated for each previously selected account. This change request includes the data item (e.g. new address), as well as any other information required by the financial institutions (e.g. account information, authentication information, and the like).

In STEP 420, each change request is sent to a set of financial institutions associated with the identified accounts through the financial institution interface module. As previously described, the change requests may be sent to the financial institutions via numerous methods, including direct server to server connections, web page scripts, API's provided by the financial institution, as well as other mechanisms. Those skilled in the art will appreciate that there will be other methods by which to send the change requests to the financial institutions.

In STEP 425, notifications are received from the financial institutions about the status of the change requests and the associated accounts (e.g. change request succeeded and account was updated, change request failed and account was not updated, change request not sent, and the like), and a report is generated for the user, presenting the information of the notifications. The report may list the set of accounts and results of associated change requests as provided by the financial institutions.

Figure 4B:
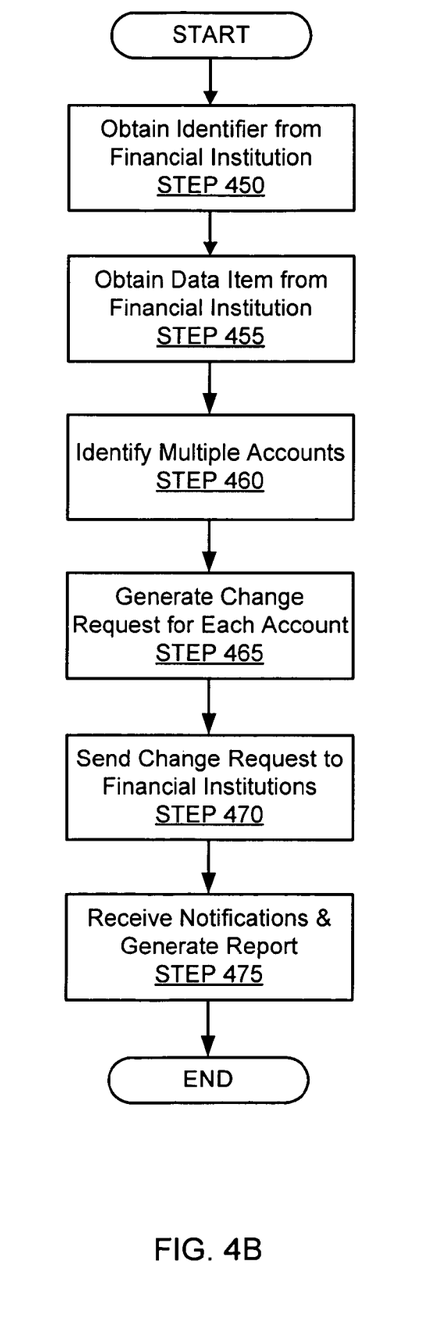

FIG. 4B shows a flowchart in accordance with one or more embodiments of the invention. The process shown in FIG. 4B may be used, for example, to update multiple financial accounts with an address change. Those skilled in the art, having the benefit of this detailed description, will appreciate that the sequence of steps shown in FIG. 4B may differ among embodiments of the invention, and that one or more of the steps may be optional.

In STEP 450, an identifier (e.g. social security number) associated with a user from a financial institution is obtained. The identifier is used to uniquely identify a user associated with a set of financial accounts.

In STEP 455, a data item associated with a change request (e.g. new address) from a financial institution is obtained. This data may be associated with an account of the financial institution. For example, a user independently updates his address for an account of a financial institution, and that financial institution sends that update (i.e. data item) to the financial account manager for it to update its own system and other accounts associated with the user. In this way the financial account manager may truly keep all accounts associated with an individual up-to-date with current information.

In STEP 460, multiple accounts associated with the user are identified by using the identifier (e.g. social security number) provided by the financial institution to access said accounts. In the case of an address change, a set of financial accounts associated with the user and a specified old address are identified. The user is then requested to select a subset of the identified accounts to be updated.

In STEP 465, a change request for each previously selected account. This change request is generated. The change request includes the data item (e.g. new address), as well as any other information required by the financial institutions (e.g. account information, authentication information, and the like).

In STEP 470, the change requests are sent to a set of financial institutions associated with the selected accounts. As previously described, the change requests may be sent to the financial institutions via numerous methods, including direct server to server connections, web page scripts, API's provided by the financial institutions, as well as other mechanisms. Those skilled in the art will appreciate that there will be other methods by which the change requests are sent to the financial institutions.

In STEP 475, notifications are received from the financial institutions regarding the status of the change requests and the associated accounts (e.g. change request succeeded and account is updated, change request failed and account is not updated, change request not sent, and the like), and a report for the user is generated, presenting the information of the notifications. The report may list the set of accounts and results of associated change requests as provide by the financial institutions. Although the steps described are from a system perspective, the steps of the process from a user's perspective are essentially mirrored.

Figure 5:
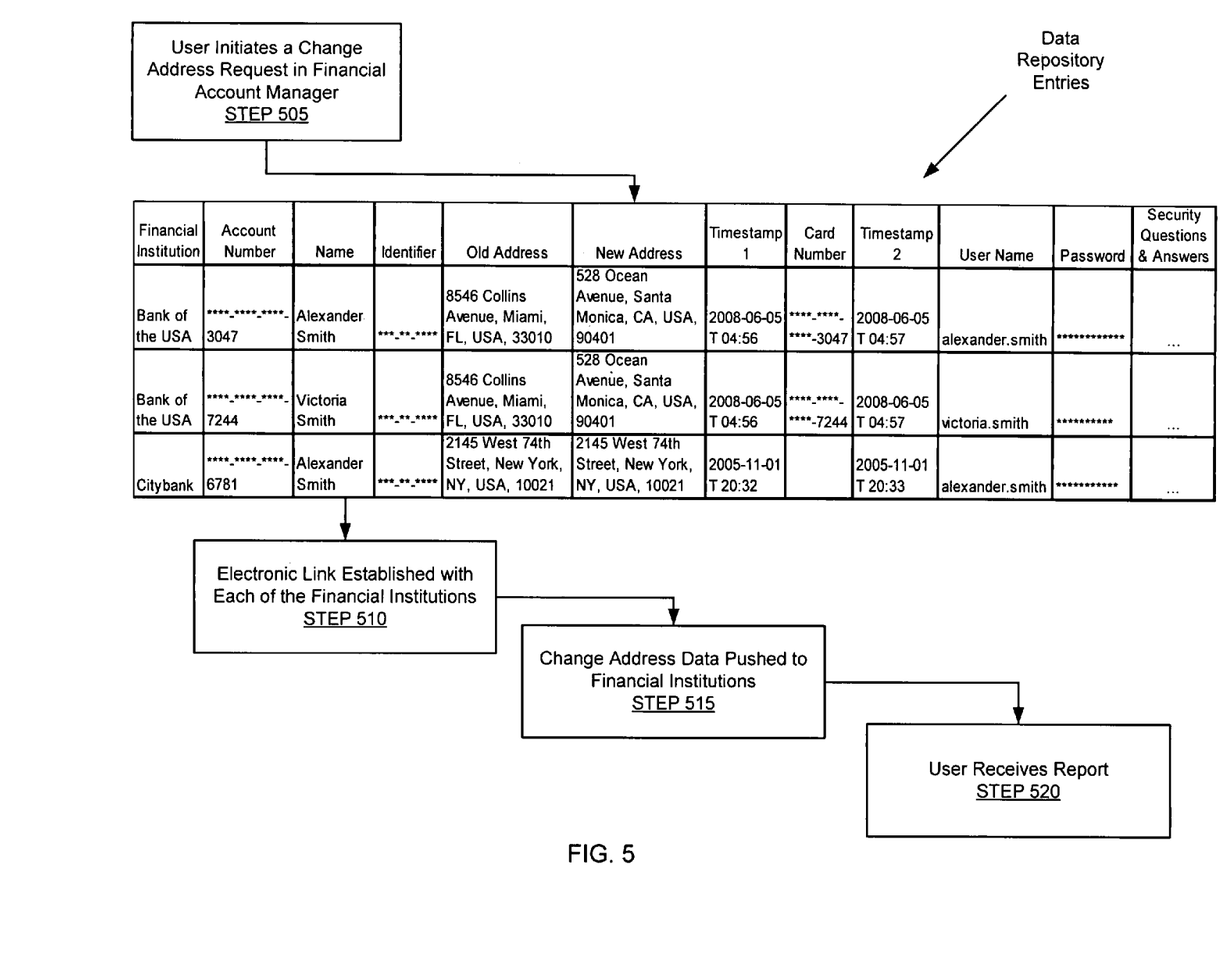
FIGS. 5 and 6 show flow diagrams in accordance with one or more embodiments of the invention.

FIG. 5 shows an example in accordance with one or more embodiments of the invention. The example shown in FIG. 5 may be used, for example, to update multiple financial accounts with an address change. Those skilled in the art, having the benefit of this detailed description, will appreciate that the sequence of steps shown in FIG. 5 may differ among embodiments of the invention, and that one or more of the steps may be optional.

In STEP 505, a user initiates a change request by providing a new address (e.g. a CA residence) and an old address (e.g. a FL residence) through the GUI or mobile module of a financial account manager. The user may have multiple accounts linked to multiple residences (e.g. FL and NY residences), but may only wish to update a set of accounts associated with one residence (e.g. FL). The data repository is subsequently updated with this new address information as provided by the user, and only applies it to those accounts associated with the specified old address. The other accounts (i.e. those not associated with the specified old address) are not updated with the new address information. The updates to the accounts are accompanied by timestamps.

In STEP 510, an electronic link is established with each of the financial institutions associated with the accounts to be updated, as possible. If a financial institution (115) does not have a direct server to server connection, an API, a website that a script may access, or other methods of electronic access, then an alternative means may be used to transfer the request data (e.g. a postal delivery or email specifying the requested update).

In STEP 515, the updated address data is pushed to the financial institutions. After receiving the updated address data, the financial institutions sends back notifications informing the financial account manager of the status of the requests and accounts associated with those requests. This information will be parsed and reformatted into a form presentable to the user, such as a report.

In STEP 520, the user receives the report detailing the status of the requests and accounts associated with each of the financial institutions. An example of this report is demonstrated in FIG. 6.

Figure 6:
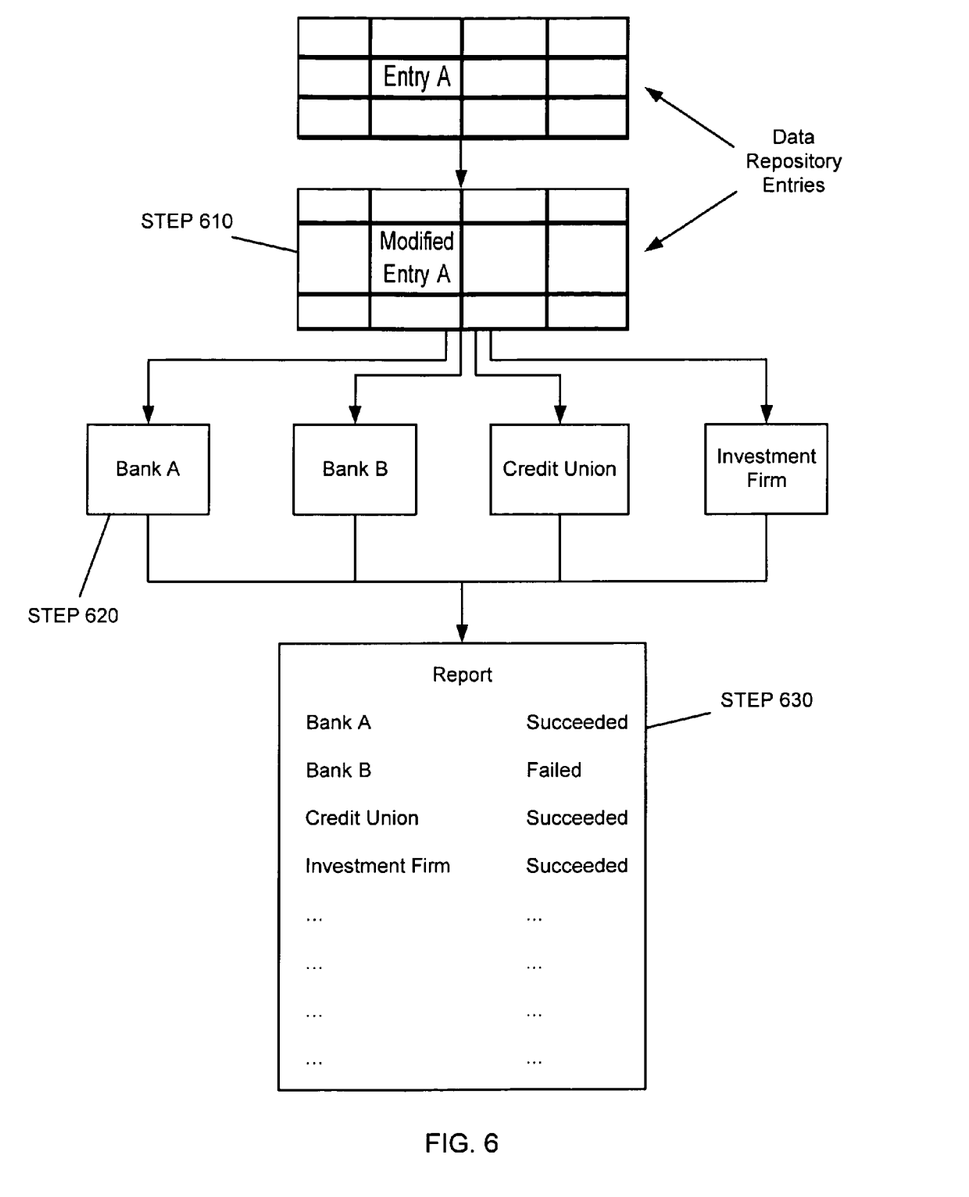

FIG. 6 shows an example in accordance with one or more embodiments of the invention. The example shown in FIG. 6 may be used, for example, to alert multiple financial institutions when cards associated with accounts of those financial institutions are lost or stolen. Those skilled in the art, having the benefit of this detailed description, will appreciate that the sequence of steps shown in FIG. 6 may differ among embodiments of the invention, and that one or more of the steps may be optional.

In STEP 610, an entry of the data repository is modified by updated data, either obtained from a user or a financial institution. This entry may be associated with, for example, an updated address, or a missing wallet. The financial account manager then generates request(s) and sends the request(s) to a set of financial institutions associated with the accounts to be revised with the updated data.

In STEP 620, the financial institutions (e.g. bank A, bank B, credit union, investment firm) receive the request(s) sent by the financial account manager. The request(s), in return, generate notifications regarding the status of the request(s) and the associated accounts, and send the notifications to the financial account manager. When the financial account manager receives the notifications, the contents of the notifications are compiled and reformatted into a report.

In STEP 630, the aforementioned report is presented to the user. The report may have elements including bank names (e.g. bank A, bank B, credit union, investment firm, and the like) and request outcomes (e.g. succeeded, failed, indeterminate, and the like). Those skilled in the art will appreciate that the report may have various other means and metrics used to present information to a user, including graphs, charts, matrices, account numbers, addresses, card numbers, and the like.

Figure 7:
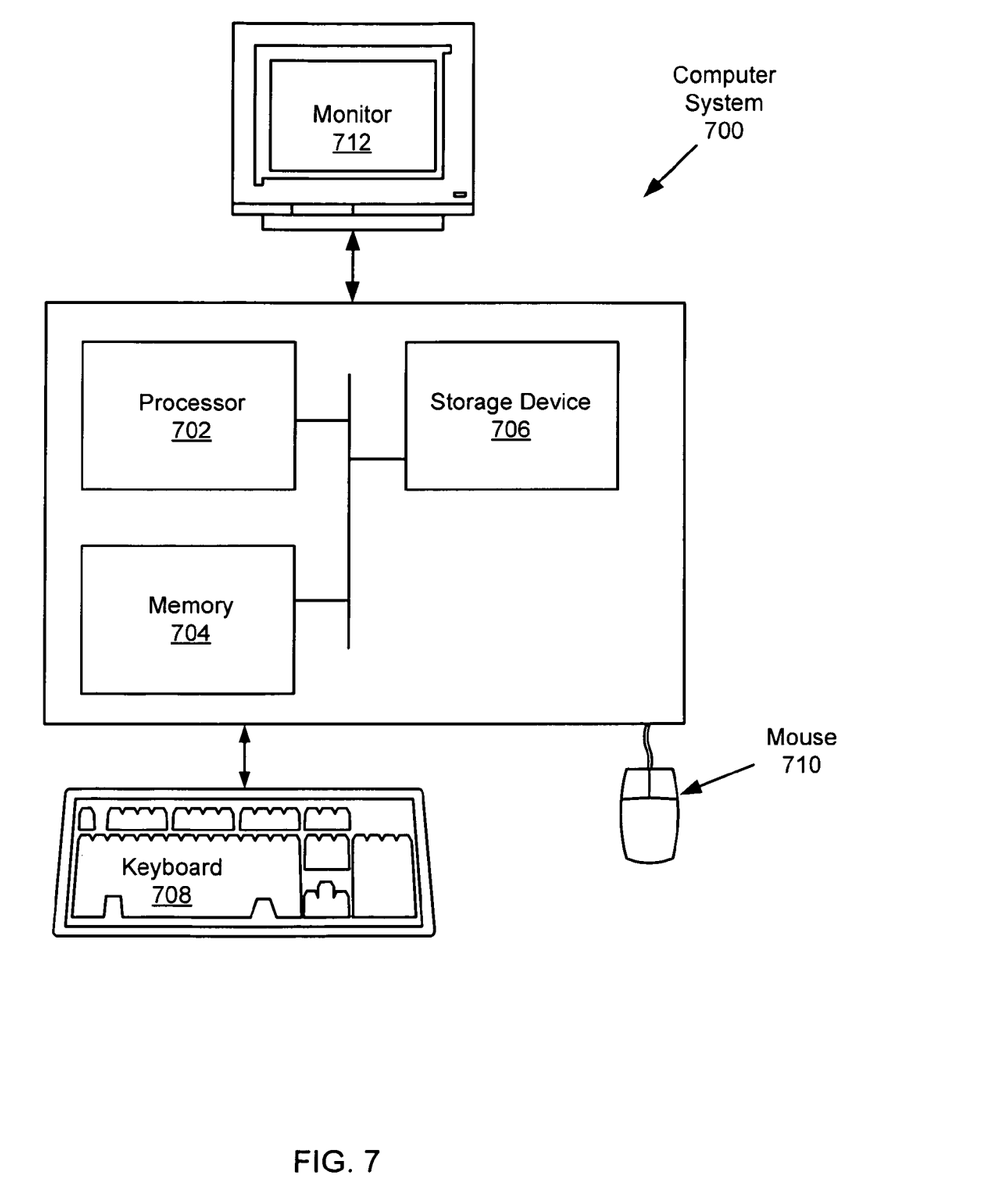
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer system (700) may also include input means, such as a keyboard (708), a mouse (710), or a microphone (not shown). Further, the computer system (700) may include output means, such as a monitor (712) (e.g., a liquid crystal display (LCD), a plasma display, or cathode ray tube (CRT) monitor). The computer system (700) may be connected to a network (not shown) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention (e.g., application data storage, aggregation engine, data analysis engine, rules engine, etc.) may be located on a different node within the distributed system. In one or more embodiments of the invention, the node corresponds to a computer system; however, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing financial accounts, comprising:
receiving, from a user, a new address of the user and a first old address of the user, wherein the new address is an update of the first old address;
identifying a first account of the user at a first financial institution, and a second account of the user at a second financial institution;
generating, without intervention from the user, using a processor, and for the first financial institution, a first address change request comprising the new address and the first old address;
transmitting the first address change request to the first financial institution;
receiving a success notification from the first financial institution indicating that the first financial institution successfully updated the first old address in the first account to the new address;
generating, without intervention from the user, using the processor, and for the second financial institution, a second address change request comprising the new address and the first old address;
transmitting the second address change request to the second financial institution;
determining that the second account at the second financial institution comprises a second old address that is distinct from the first old address;
receiving, from the second financial institution, a failure notification indicating that the second financial institution failed to update the second account with the new address because the second account comprises the second old address instead of the first old address, and
generating, for the user and using the processor, a report comprising the first financial institution, the success notification, the second financial institution, and the failure notification.

2. The method of claim 1, further comprising:
obtaining an account identifier, wherein the first account and the second account are obtained based on the account identifier; and
requesting permission to update the first account and the second account with the new address before generating the first address change request and the second address change request.

3. The method of claim 2, further comprising:
obtaining the account identifier and the new address from a third financial institution managing a third account, wherein the third account is updated using the new address before requesting permission to update the first account and the second account.

4. The method of claim 1, wherein the first address change request and the second address change request are sent using at least one selected from a group consisting of a server-to-server connection, a web-page interaction script, and an application programming interface (API).

5. The method of claim 1, wherein the first address change request and the second address change request are sent using at least one selected from a group consisting of an email and a letter delivered by post.

6. The method of claim 1, wherein the new address is obtained from at least one selected from a group consisting of a mobile device and a financial software application.

7. The method of claim 2, further comprising:
obtaining permission to update the first account and the second account from a mobile device.

8. The method of claim 1, further comprising:
receiving, from the user, a missing wallet notification indicating that a wallet of the user is lost.

9. The method of claim 2, wherein the account identifier is at least one selected from a group consisting of a social security number, a password, and a personal identification number (PIN).

10. The method of claim 1, wherein the new address includes a first timestamp exceeding a second timestamp held by the first institution and associated with the first account.

11. A system for managing financial accounts, comprising:
a processor;
a memory operatively connected to the processor; and
a financial account manager resident in the memory and configured to:
receive, from a user, a new address of the user and a first old address of the user, wherein the new address is an update of the first old address;
identify a first account of the user at a first financial institution, and a second account of the user at a second financial institution;
generate, without intervention from the user and for the first financial institution, a first address change request comprising the new address and the first old address;
transmit the first address change request to the first financial institution;
receive a success notification from the first financial institution indicating that the first financial institution successfully updated the first old address in the first account to the new address;
generate, without intervention from the user and for the second financial institution, a second address change request comprising the new address and the first old address;
transmit the second address change request to the second financial institution;
determine that the second account at the second financial institution comprises a second old address that is distinct from the first old address;
receive, from the second financial institution, a failure notification indicating that the second financial institution failed to update the second account with the new address because the second account comprises the second old address instead of the first old address; and
generate, for the user, a report comprising the first financial institution, the success notification, the second financial institution, and the failure notification.

12. The system of claim 11, wherein the financial account manager is further configured to:
obtain an account identifier, wherein the first account and the second account are obtained based on the account identifier; and
request permission to update the first account and the second account with the new address before generating the first address change request and the second address change request.

13. The system of claim 12, wherein the financial account manager is further configured to:
obtain the account identifier and the new address from a third financial institution managing a third account, wherein the third account is updated using the new address before requesting permission to update the first account and the second account.

14. The system of claim 11, wherein the new address is received from a mobile device.

15. A computer readable medium storing instructions to manage financial accounts, the instructions comprising functionality to:
receive, from a user, a new address of the user and a first old address of the user, wherein the new address is an update of the first old address;
identify a first account of the user at a first financial institution, and a second account of the user at a second financial institution;
generate, without intervention from the user and for the first financial institution, a first address change request comprising the new address and the first old address;
transmit the first address change request to the first financial institution;
receive a success notification from the first financial institution indicating that the first financial institution successfully updated the first old address in the first account to the new address;
generate, without intervention from the user and for the second financial institution, a second address change request comprising the new address and the first old address;
transmit the second address change request to the second financial institution;
determine that the second account at the second financial institution comprises a second old address that is distinct from the first old address;
receive, from the second financial institution, a failure notification indicating that the second financial institution failed to update the second account with the new address because the second account comprises the second old address instead of the first old address, and
generate, for the user, a report comprising the first financial institution, the success notification, the second financial institution, and the failure notification.

16. The computer readable medium of claim 15, the instructions further comprising functionality to:
obtain an account identifier, wherein the first account and the second account are obtained based on the account identifier; and
request permission to update the first account and the second account with the new address before generating the first address change request and the second address change request.

17. The computer readable medium of claim 16, the instructions further comprising functionality to:
obtain the account identifier and the new address from a third financial institution managing a third account, wherein the third account is updated using the new address before requesting permission to update the first account and the second account.

18. The computer readable medium of claim 15, wherein the new address is received from a mobile device.

19. The computer readable medium of claim 15, wherein the new address includes a first timestamp exceeding a second timestamp held by the first institution and associated with the first account.

20. The method of claim 1, further comprising:
transmitting the report to a mobile device of the user.

* * * * *